United States Patent

[11] 3,617,735

| | | |
|---|---|---|
| [72] | Inventor | David J. Shoemaker<br>Columbus, Ohio |
| [21] | Appl. No. | 771,688 |
| [22] | Filed | Aug. 13, 1968 |
| [45] | Patented | Nov. 2, 1971 |
| [73] | Assignee | Industrial Nucleonics Corporation |

[54] MATERIAL LEVEL DETECTOR
13 Claims, 4 Drawing Figs.

[52] U.S. Cl................................................. 250/43.5,
250/83.3
[51] Int. Cl..........................................G01n 23/12
[50] Field of Search........................... 250/43.5
FL, 43.5 R, 83.3 D

[56] References Cited
UNITED STATES PATENTS
3,064,357  11/1962  Butters................ 250/43.5 X

*Primary Examiner*—James W. Lawrence
*Assistant Examiner*—Davis L. Willis
*Attorneys*—Lowe and King, William T. Fryer, III and C. Henry Peterson ABSTRACT: A level detector for fluent material in a receptacle or conduit includes a gamma ray source and detector means for deriving a signal indicative of the amount of radiation absorbed by the material. The output of the detector is fed to a pair of channels, each including a comparator network having a different reference input. The comparator channels together feed a logic network whereby a deadband is established between material levels related to the reference inputs to the comparators.

INVENTOR,
DAVID J. SHOEMAKER
BY Lowe & King
ATTORNEYS

INVENTOR,
DAVID J. SHOEMAKER

BY Lowe & King
ATTORNEYS

MATERIAL LEVEL DETECTOR

The present invention relates generally to systems for analyzing the amount of material in a conduit or receptacle and, more particularly, to a system of said class utilizing a source of penetrating radiation and including provisions for deadband and deriving a binary output signal.

Systems for analyzing the amount or density of material in a conduit or receptacle relying upon absorption of penetrating radiation are known. Typically, such systems indicate the level of a fluent material in a bin or pipe by irradiating the substance with a penetrating radiation beam derived, for example, form a gamma or X-ray source. The density of the material is determined by ascertaining the amount of energy the material absorbs by employing a detector positioned to receive energy transmitted through the material. Alternatively, the amount of radiation in the beam absorbed by the material can be measured by a detector responsive to radiation backscattered from the material.

To indicate if the material density is above or below a predetermined amplitude, some particular problems are encountered with systems utilizing penetrating radiation because the energy levels derived from such radiation sources are random in nature, being defined by the Poisson distribution. In particular, the amount of penetrating radiation energy absorbed by a standard sample varies on a statistical basis so that the output of a detector measuring the sample density is a function determined by the Poisson distribution properties of a source, as well as the amount of density of the material being irradiated by the source. When the device is utilized for detecting the level of a fluent material the random nature of the energy is great enough to produce fairly frequent erroneous indications of material density if a single demarcation line were utilized to indicate that the fluent material is above or below a predetermined height.

In accordance with the present invention, the erroneous indications resulting from the random nature of particles emitted by a penetrating radiation source relative to a predetermined value are materially reduced by providing a deadband between a pair of reference value indicative of lower and upper density limits. In conjunction with systems for determining if the height of a fluent material is above or below a predetermined level, means is provided for establishing first and second reference levels, respectively indicative of the two deadband limits. The deadband is established by feeding the outputs derived from a pair of comparators responsive to the reference levels and the detected radiation level to a logic network including a memory element, such as a flip-flop.

The logic circuit and memory element are arranged so that if the detected radiation level is greater or less than the reference amplitudes, different predetermined outputs are derived from the flip-flop. If, however, the radiation level is between the two reference amplitudes the memory device remains activated to the same state as it previously occupied. Thereby, as fluctuations in the energy emitted by the penetrating radiation source occur while a fluent material having a height in the deadband region is being monitored, the output of the system in accordance with the present invention does not vary. In addition, slight variations in the density of the material being monitored do not result in changes in the output if the level of the material being monitored is in the deadband region. The circuitry to achieve the deadband or hysteresis effect includes means whereby rapid fluctuations in the source energy level or material density do not generally affect the output of the present device while the material height is within the deadband.

The stated result is attained by providing an averaging circuit, responsive to the detected energy, with a relatively long time-constant network while it is operating in the deadband region. Outside of the deadband region, however, the averaging circuit has a short time-constant network, enabling it to switch quickly into the deadband-operating mode. The averaging circuit particularly utilized for these purposes includes an operational amplifier with a parallel resistance capacitance feedback network and a resistive input circuit responsive to pulses of reference amplitude and width derived from a network triggered by the received radiation. The averaging circuit integrates the pulses to derive an indication of the received radiation count rate, which indication is compared with a reference amplitude, equal to one of the deadband limits. In response to the count rate indication being different from the reference amplitude, the short time constant network, formed through the input resistor, is effective. In contrast, the long time-constant circuit including the feedback resistor is activated when the operational amplifier is switching between states in response to the count rate and reference amplitude being equal.

Additional features of the present invention are that transistor circuitry is employed to a great extent and the memory element comprises an integrated circuit flip-flop. In order to check the operation of the flip-flop, the collectors of transistors included therein are connected together via an AND gate. Only if a malfunction to the integrated circuit flip-flop occurs is each of the collector circuits energized to a high-level voltage and a binary one is derived from the AND circuit. The resulting output of the AND circuit is combined with the output of the memory circuit to control an output device, such as an indicator lamp or a controller for feeding fluent material through a conduit or into a receptacle.

It is, accordingly, an object of the present invention to provide a new and improved system for analyzing and controlling the amount of material in a conduit or receptacle by utilizing penetrating radiation.

Another object of the present invention is to provide a system for deriving a binary signal indicative of and for controlling the amount of material in a conduit or receptacle.

Still another object of the invention is to provide a new and improved penetrating radiation system for indicating whether the height of material in a conduit or receptacle is above or below a predetermined level.

A further object of the invention is to provide a new and improved system for indicating and controlling the amount of material in a conduit or receptacle wherein a deadband is provided between reference values designating upper and lower limits.

Still another object of the invention is to provide a new and improved system utilizing penetrating radiation for measuring and/or controlling the amount of material in a receptacle or conduit wherein any adverse effects associated with the statistical nature of the penetrating radiations are materially reduced.

Yet a further object of the invention is to provide, in a system for measuring and/or controlling the amount of material in a receptacle or conduit utilizing penetrating radiation, a circuit having a slow response time for operation about a reference value and a fast response time for operation outside of the reference value.

The above and still further objects, features and advantages of the present invention will become apparent upon consideration of the following detailed description of several specific embodiments thereof, especially when taken in conjunction with the accompanying drawings, wherein.

Figure 1:
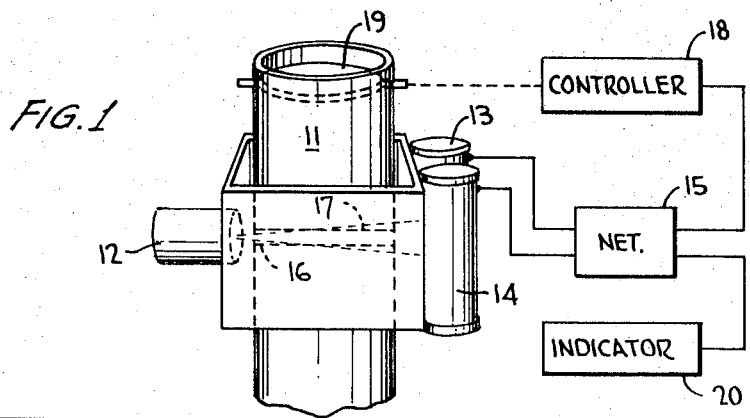
FIG. 1 is a perspective view illustrating one embodiment of the present invention in combination with a system for monitoring and controlling the flow of fluid material through a pipe.

Reference is now made to FIG. 1 of the drawings wherein the level of fluent material which may be liquid, solid or gaseous, in pipe 11 is monitored and controlled in response to absorption by the material of radiation from the pencil-shaped penetrating radiation beam emanating from gamma ray source 12. Positioned on the side of the pipe 11 opposite from source 12 is a plurality of detector units, specifically illustrated as a pair of detectors 13, 14. Detector units 13 and 14 are positioned so that the longitudinal axes thereof are parallel and they are equally irradiated by penetrating radiation from the source. The entire assemblage of source 12 and the two detectors 13 and 14 is located exteriorly of pipe 11 so that no interruption in the normal operation of the pipe occurs.

As the level of fluent material stored in pipe 11 increases and decreases, the density of material in the path of the beam derived from source 12 is correspondingly changed so that the count rate derived by detector units 13 and 14 is modified in an inverse manner as a function of density and level. With the level of fluent material in pipe 11 at a relatively low level, at a point, for example where none of the radiation from source 12 is absorbed thereby, detectors 13 and 14 derive high-count rates in response to the large amount of energy propagated thereto. In contrast, as the level of the fluent material in pipe 11 increases to a height greater than detectors 13 and 14, the detectors derive relatively few counts. In the region between the upper and lower extremities of detector units 13 and 14, the count rates derived by the detectors vary as a linear function, over a relatively long time period.

On an instantaneous basis, however, assuming a constant density material in pipe 11, the outputs of detector units 13 and 14 are subject to fluctuations due to the random nature of the energy in the beam produced by penetrating radiation source 12. If some type of deadband means is not provided to indicate whether the level is above or below a predetermined line in pipe 11, the random variations in the energy derived by source 12 may be reflected in the output counts derived by detectors 13 and 14.

To process the detected radiation, the outputs of detectors 13 and 14 are fed in parallel to an electronic network 15 which derives a binary output signal indicative of whether the level of fluent material in pipe 11 is greater or less than a predetermined height. Network 15 includes deadband circuitry whereby if the radiation level indicates that the height of the material in pipe 11 increases from below a predetermined minimum level designated by line 16, the output of network 15 remains at a binary level indicative of the height being less than line 16. If the detected radiation level indicates that the height of the fluent material is greater than the upper limit defined by line 17, the binary output of network 15 changes in value. Conversely, if the detected radiation level indicates that the height of the material the pipe 11 decreases from a level above line 17 to a level below line 17, the output of network 15 remains at a binary value indicative of the fluent material being at a level greater than line 17. As the detected radiation increases to indicate a level of the fluent material lower than that indicated by line 16, the output of network 15 changes in value. The reference to variations about lines 16 and 17 are made assuming a constant radiation level of source 12.

In actual practice the energy of radiation from source 12 does not remain constant and is subject to random fluctuations governed by the Poisson relationship. Hence, the radiation level reaching detectors 13 and 14 is not always an accurate indication of the height of the material in pipe 11 but varies with the random energy distribution. If the binary output of network 15 changed value about one demarcation line, it would likely reflect the random variations in the energy distribution of source 12. By including in network 15 a deadband provision simulating lower and upper levels defined by lines 16 and 17, the adverse effects of the random energy distribution of radiation source 12 are obviated.

Network 15 includes means for driving an indicator 20 and/or controller 18 for the height of fluent material in pipe 11. The output of network 15 can be arranged to activate indicator 20 or controller 18 in response to indications of the material level being less than line 16 or greater than line 17. Controller 18 comprises an ON-OFF device, such as a relay for rotating valve 19 either to a full-open or full-closed position, whereby the height of the fluent material in pipe 11 is controlled by gravity flow through valve 19 in response to the binary output of network 15 that actuates controller 18.

Figure 2:
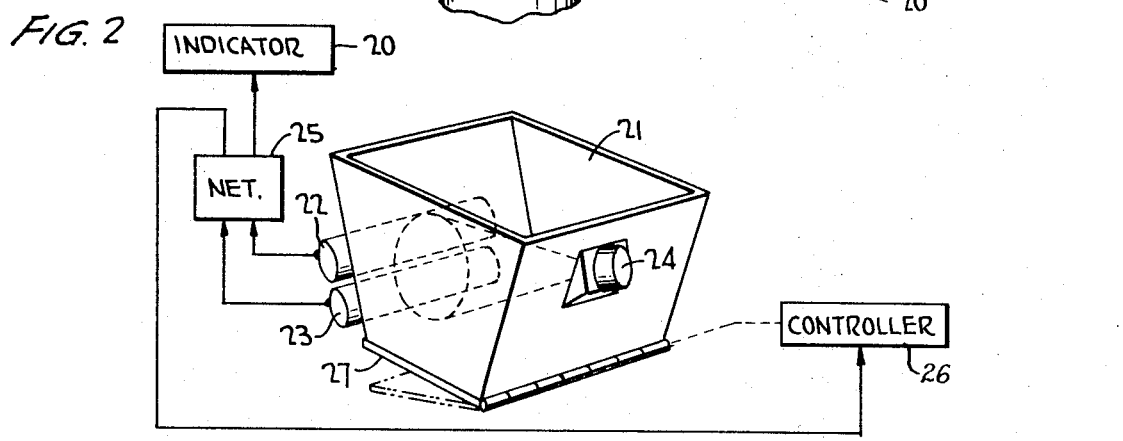
FIG. 2 is a diagram of a second embodiment for indicating and controlling the level of fluent material in a bin.

In accordance with a modification of the present invention illustrated in FIG. 2, the height of the fluent material in bin 21 is controlled in response to the outputs of detectors 22 and 23, positioned on a wall of the bin opposite from source 24 which emits a wedge-shaped beam of penetrating energy. Detectors 22 and 23 drive network 25, identical with network 15, which in turn activates an indicator and/or supplies binary pulses to controller 26 that rotates the floor 27 of bin 21 to a position to enable the bin contents to be emptied or retained. If the contents of bin 21 exceed a predetermined level, network 25 derives an output signal which activates controller 26 to open the bottom of bin 27 while the bin bottom is closed if the level of fluent material therein is less than a predetermined height. The maximum and minimum levels for activating controller 26 again include a provision for deadband.

Figure 3:
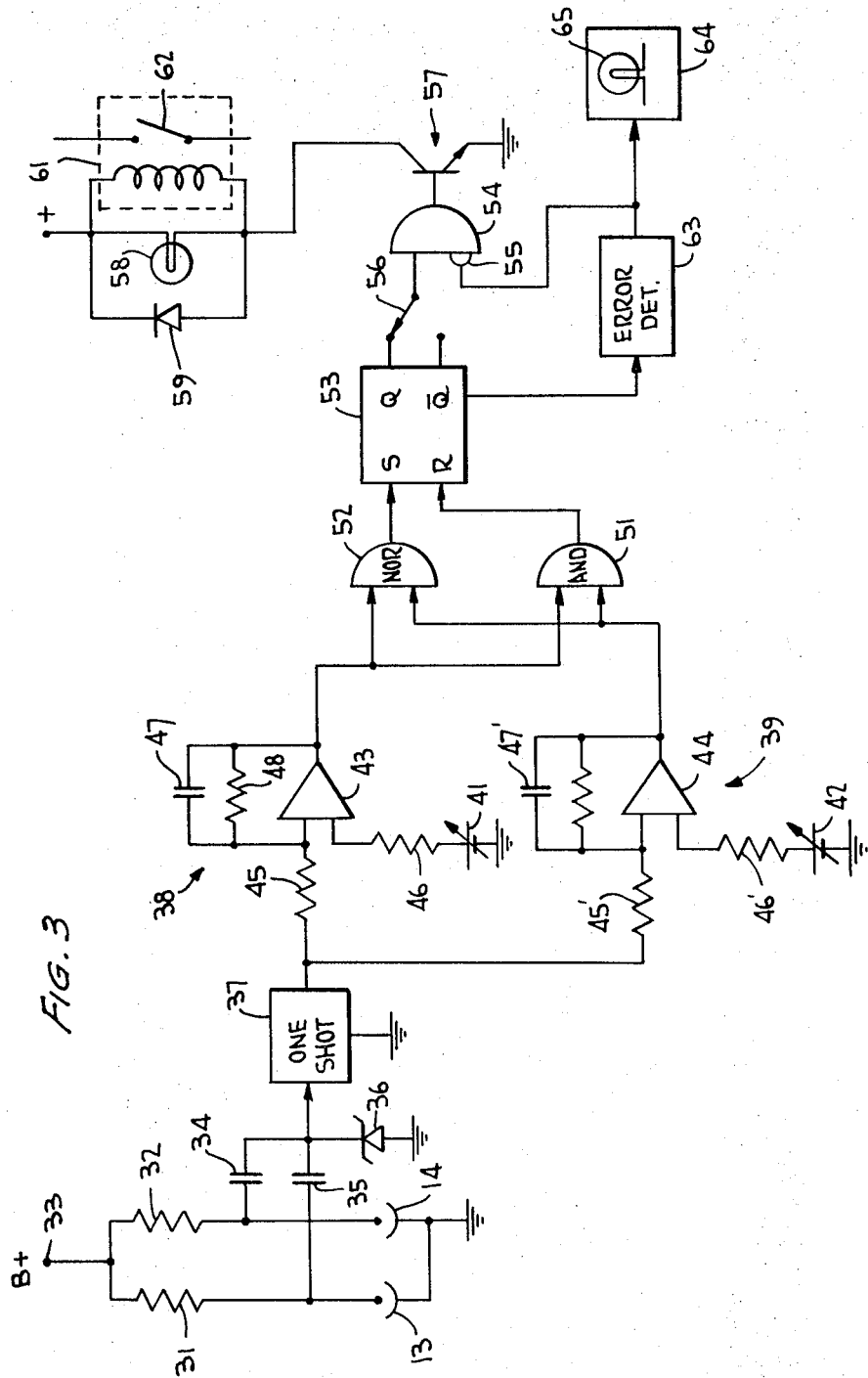
FIG. 3 is a schematic diagram of the electronics network adapted to be utilized with either FIG. 1 or FIG. 2.

Reference is now made to FIG. 3 of the drawings wherein there is illustrated a schematic diagram of the network employed in either FIG. 1 or FIG. 2; to facilitate the description, however, the circuit of FIG. 3 is described in conjunction with the system of FIG. 1. Radiation detectors 13 and 14, which may comprise conventional Geiger-Mueller tubes, are driven through resistors 31 and 32, respectively, from a high-voltage DC source, having a magnitude on the order of 900 volts, at terminal 33. The pulses derived from Geiger-Mueller tubes 13 and 14 are decoupled from each other by capacitators 34 and 35 which feed voltage regulating Zener diode 36. The voltage waveform developed across Zener diode 36 typically has a base value on the order of +10 volts and includes a negative 5-volt excursion in response to each count detected by Geiger-Mueller tubes 13 and 14. As the height of the material in pipe 11 or bin 21 increases, the number of pulses derived across Zener diode 36 decreases as a relatively linear function.

The pulse wavetrain developed across Zener diode 36 is fed to one-shot multivibrator 37, of relatively conventional design, and comprising the usual resistance-capacitance relaxation network. Multivibrator 37 is adjusted so that in response to each pulse fed thereto a rectangular voltage of predetermined amplitude, width and duty cycle is derived. Typically, the width and height of each pulse derived by multivibrator 37 are 1.4 milliseconds and 10 volts, respectively, while the duty cycle of the wavetrain is on the order of 25 percent. For these parameters, the average value of the wavetrain derived from multivibrator 37 is represented as a function of count rate received by detectors 13 and 14 by a straight line having a slope of approximately 70 counts per volt and including a point at the origin.

The pulses of reference amplitude and width derived from one-shot multivibrator 37 are applied in parallel to a pair of comparator channels 38 and 39, having reference DC inputs respectively representative of the high- and low-amplitude boundaries of the deadband. Each of channels 38 and 39 includes means for integrating or smoothing the pulsating output of multivibrator 37 and for deriving a binary output indicative of whether the average value of the one-shot output is greater or less than the reference voltages of DC source 41 and 42.

The comparators in each of channels 38 and 39 comprise differential operational amplifiers 43 and 44 respectively having input resistors and feedback capacitors of identical characteristics in each channel. In particular, the positive input terminal of amplifier 43 in channel 38 is driven by the output of one-shot multivibrator 37 through resistor 45, while the negative input terminal of the amplifier is responsive to the high limit indicating voltage derived from variable DC source 41, as fed through resistor 46. To integrate the variable pulse rate output of one-shot multivibrator 37, the feedback path of amplifier 43 includes capacitor 47 which is connected in shunt with resistor 48. The values of resistors 46 and 48 determine the sensitivity of the amplifier in switching between cutoff and saturation and are selected to enable the state of amplifier 43 to vary between these two extreme states in response to a change of one pulse per unit time in the output of one-shot multivibrator 37. The change in state of amplifier 43 is not instantaneous but is at a rather slow rate determined by the integrating action of capacitor 47 and resistor 48, typically having values of 2 microfarads and 10 megohms.

The impedances connected to amplifier 44 correspond virtually identically with the impedances connected to amplifier 43, hence are designated by reference numerals that are primed. The exception is with regard to the connection of resistor 46' to variable amplitude DC source 42, having a value commensurate with the lower boundary amplitude.

In operation, amplifiers 43 and 44 derive a relatively high-voltage, binary one output in response to the reference input voltages thereof, the voltages of sources 41 ad 42, being greater than the average voltage derived by one-shot multivibrator 37, as accumulated on capacitors 47 and 47'. In response to multivibrator 37 generating an output pulse whereby, for example, the voltage accumulated on capacitor 47 becomes greater than the reference voltage of source 41, amplifier 43 switches from a high-voltage to a low-voltage state with a time constant determined by the values of resistor 48 and capacitor 47, as mentioned supra. Because of the statistical properties of the penetrating radiation from source 12, the time constant of the feedback network comprising resistor 48 and capacitor 47 is selected to be relatively large. Thereby, the output of amplifier 43 does not rapidly change from a binary zero to a binary one state or vice versa if the number of counts from radiation source 12 should suddenly change while the system is operating in the regions around sources 41 and 42. Instead, approximately 2 seconds are required for a complete transition of amplifiers 43 and 44 from one state to another and the possibility of a false change in the outputs of amplifiers is materially reduced. On the other hand, the responses of comparator amplifiers 43 and 44 are relatively fast when the system is operating in a region removed from the values of sources 41 and 42. The fast response of the comparators in this region is determined by selecting the values of resistor 45 and capacitor 47 so that the product of their values is relatively small, on the order of $2 \times 10^2$ sec., in comparison with the product of the values of resistor 48 and capacitor 47.

In general, therefore, it can be stated that the output of comparator channel 38 has a binary zero value whenever the count rate derived by one-shot multivibrator 37 exceeds a predetermined limit determined by the relatively high voltage of DC source 41 while the output of comparator 39 is a binary zero level in response to the count rate output of the one being greater than a predetermined lower limit, set by the value of DC source 42. The binary zeros and ones derived from comparators 38 and 39 are combined in a logic and memory network including AND-gate 51, NOR-gate 52 and bistable flip-flop 53, the set and reset inputs of which are respectively driven by the outputs of the NOR and AND gates. Gates 51 and 52, as well as flip-flop 53, are connected so that a binary one signal is derived from the Q output of the flip-flop in response to the count rate output being greater than the level set by DC source 41, while a binary one signal is derived from the $\bar{Q}$ output of the flip-flop in response to the count rate output being less than the reference level set by DC source 42. If the count rate input is between the reference level set by sources 41 and 42, the state of flip-flop 53 is not modified by the outputs of channels 38 and 39.

The foregoing relationships are seen by considering three specific conditions, viz: the count rate output of one-shot multivibrator 37 producing a voltage having an average value less than reference voltage source 42; the average value of the voltage derived by the one shot being between the voltages of sources 41 and 42; and the count rate generated by the one shot being greater than the reference level set by source 41. For the first condition, the voltages of reference sources 41 and 42 are greater than the average voltage derived by one-shot multivibrator 37, whereby the output of each of channels 38 and 39 is a binary one value. The binary one outputs of channels 38 and 39 are combined in AND-gate 51 and NOR-gate 52, the former deriving a binary one output and the latter a binary zero output. In response to the binary one output of AND-gate 51, flip-flop 53 is activated to the reset state, whereby the Q and $\bar{Q}$ outputs of the flip-flop respectively generate binary signals having values of zero and one.

If the count rate output of one-shot multivibrator 37 is in the deadband region, i.e., the average value of the voltage generated by the one shot is between the DC levels of sources 41 and 42, a binary zero output is derived by comparator channel 38 while a binary one is generated by channel 39. In response to binary zeros and ones being respectively derived from channels 38 and 39, each of gates 51 and 52 generates a binary zero output, whereby the state of flip-flop 53 is unchanged to achieve the deadband result.

In response to the average value of the pulses derived by one shot multivibrator 37 exceeding the voltage of DC source 41, each of channels 38 and 39 generates a binary zero output. In response to channels 38 and 39 generating binary zero outputs, AND-gate 51 and NOR-gate 52 respectively generate binary zero and one signals so that flip-flop 53 is activated to the set state and a binary one level is generated at the Q output thereof.

Either the Q or $\bar{Q}$ output of flip-flop 53 is selectively connected via toggle switch 56 to the input of driver network 54, which includes inhibit terminal 55. With toggle switch 56 connected in the manner illustrated, the Q output of flip-flop 53 activates driver 54 so that the driver generates a binary one output whenever the count rate exceeds the value set by reference source 41. If, however, switch 56 is connected so that $\bar{Q}$ output of flip-flop 53 is coupled to driver 54, the driver derives a binary one output if the average value of the voltage generated by one-shot 37 is less than the reference voltage established by source 42. Because of the deadband provision, therefore, the position of toggle switch 56 is utilized to activate driver 54 for two slightly different conditions.

If the output of driver 54 is correlated with the lower and upper limit lines 16 and 17, FIG. 1, a binary one output is derived by driver 54 in response to switch 56 engaging the Q output of flip-flop 53 whenever the level of fluent material in pipe 11 exceeds the level of line 17 or has just previously exceeded the level of line 17 but has not dropped below he level of line 16. With switch 56 activated to engage the Q output of flip-flop 53, a binary one output is derived from driver 54 in response to the level of fluent material in pipe 11 being less than line 16 or in the region between lines 16 and 17 after just previously being less than the height of line 16.

The binary one output of driver 54 is fed to the base electrode of grounded emitter NPN-transistor 57 which is normally biased to cut off. Connected in the collector circuit of transistor 57 are a visual indicator comprising incandescent lamp 58 which is shunted by protective diode 59 and relay coil 61. Relay coil 61 controls activation of normally open contacts 62 which are included in the circuitry of controller 18 for activating valve 19. Thereby, in response to a binary one being derived by driver 54 to indicate that the height of the fluent material in pipe 11 is above or below a pair of predetermined levels, a visual indication is derived and valve 19 is activated to control the height of the material in pipe 11.

In a preferred embodiment, flip-flop 53 is an integrated circuit chip. Such chips, however, may be subject to malfunction, particularly in industrial environments wherein temperature and humidity have wide variations. Malfunctioning of the circuitry included on the chip is usually accompanied by the transistors on the chip being open circuited, whereby the collector supply voltage appears thereat. To detect a malfunction in all of the transistors included in the flip-flop, the collectors of all of the transistors are connected together via an AND gate included in error detector 63. If the collectors of all of the transistors of flip-flop 53 are in a high-voltage state, indicative of a malfunction to the flip-flop, error detector 63 generates a binary zero signal that is fed to inhibit terminal 55 of driver 54.

In response to inhibit terminal 55 of driver 54 being energized with a binary zero, the derivation of binary ones from the driver output is prevented so that indicator lamp 58 and relay coil 61 cannot be energized. Simultaneously the binary zero error-indicating output of detector 63 is fed to indicator circuit 64 including incandescent lamp 65. Incandescent lamp 65 is activated only in response to a binary zero being derived by error detector 63 to indicate a malfunction to the circuitry of the integrated circuit chip comprising flip-flop 53.

Figure 4:
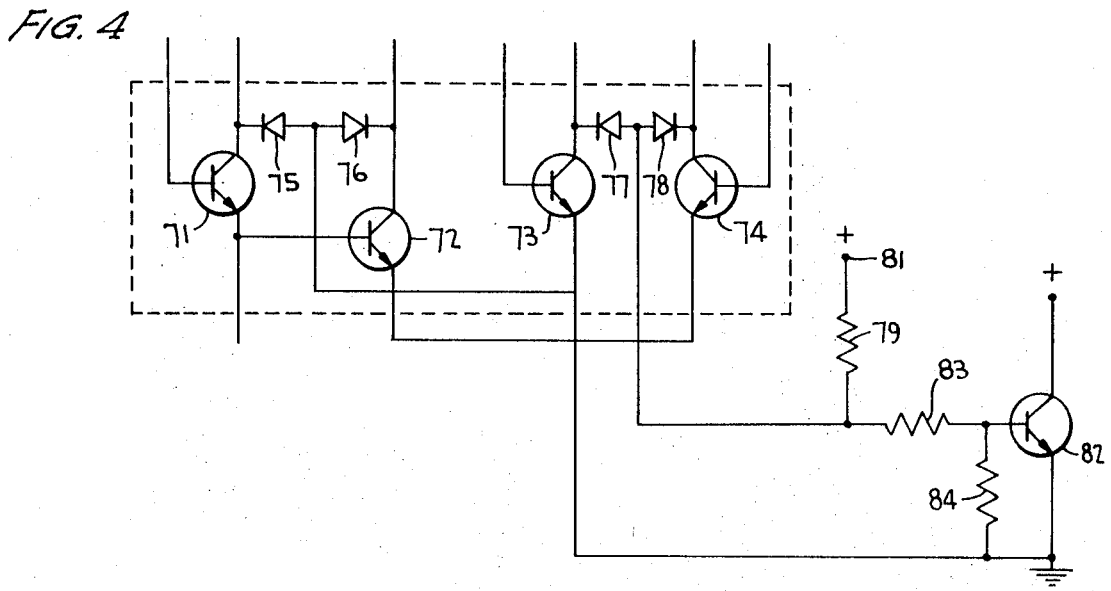
FIG. 4 is a circuit diagram of a portion of FIG. 3, specifically disclosing the circuitry involved in the error detector in combination with the flip-flop circuit.

The specific circuitry which may be utilized for error detector 63, in combination with some of the circuitry included within flip-flop 53 is specifically illustrated in the circuit diagram of FIG. 4. In FIG. 4, the transistors comprising flip-flop 53 are NPN-transistors 71-74, the former two being a Darlington driver for the latter two. The collectors of transistors 71-74 are connected together by diodes 75-78, with the cathodes of each of the diodes being connected to a different one of the collectors and the anodes of each of the diodes having a common junction. The common junction of diodes 75-78 is connected to a positive DC source at terminal 81. The junction of diodes 75-78 with resistor 79 is coupled to the base of NPN-transistor 82 via resistor 83, which together with base emitter shunting resistor 84, forms a bias network for transistor 82.

Transistor 82 is normally biased to cut off since the positive voltage at terminal 81 is fed through at least one of diodes 75-78 and the collector emitter paths of transistors 71-74 to ground. In the event of malfunctioning to the circuitry included on the chip comprising flip-flop 53, none of the collectors of transistors 71-74 can be biased to a closed circuit condition, whereby the positive voltage at terminal 81 is fed to the base of transistor 82 so that the transistor collector voltage decreases to a low-voltage binary zero state to inhibit the action of driver 54 and activate indicator lamp 65.

While there have been described and illustrated several specific embodiments of the invention, it will be clear that variations in the details of the embodiments specifically illustrated and described may be made without departing from the true spirit and scope of the invention as defined in the appended claims.

I claim:

1. A level detector for material in a receptacle or conduit comprising a source of penetrating radiation irradiating the material, detector means responsive to the amount of said radiation propagated from the material, means responsive to said detector means for deriving first and second binary signals respectively indicative of the radiation propagation being greater than first and second amounts, and logic means responsive to said binary signals for deriving an output signal indicative of the material level relative to a level established by one of said first or second amounts, said binary signal deriving means including averaging means having first and second response times, said first response time being substantially greater than said second response time and effective only in response to the radiation propagation being at one of said amounts.

2. A level detector for material in a receptacle or conduit comprising a source of penetrating radiation irradiating the material, detector means responsive to the amount of said radiation propagated from the material, means responsive to said detector means for deriving first and second binary signals respectively indicative of the radiation propagation being greater than first and second amounts, and logic means responsive to said binary signals for deriving an output signal indicative of the material level relative to a level established by one of said first or second amounts, said binary signal deriving means including: means for deriving a first signal having an average value commensurate with the amount of said radiation propagated, means for comparing the average value of the first signal with a reference signal indicative of one of said amounts to derive one of said binary signals, said comparing means including means for establishing a slow speed of response therefor in response to the average value and reference signal having a unique predetermined amplitude relationship and for establishing a fast speed of response therefor in response to the average value and reference signal having a predetermined amplitude relationship different from the unique relationship.

3. The level detector of claim 2 wherein said means for deriving a signal having an average value commensurate with the amount of propagated radiation includes a generator for deriving a pulse of predetermined amplitude, width and duty cycle in response to each received radiation count, and said comparing means includes an amplifier having a resistive input responsive to the pulse and reference signal, and a feedback path including a resistor and capacitor in shunt with each other, said amplifier being switched between saturation to cut off in response to the average value being equal to the reference signal.

4. A level detector for material in a receptacle or conduit comprising a source of penetrating radiation irradiating the material, detector means responsive to the amount of said radiation propagated from the material, means responsive to said detector means for deriving first and second binary signals respectively indicative of the radiation propagation being greater than first and second amounts, logic means responsive to said binary signals for deriving an output signal indicative of the material level relative to a level established by one of said first or second amounts, and means responsive to said logic means for detecting a malfunction thereof.

5. The level detector of claim 4 wherein said malfunction-detecting means includes means for inhibiting the derivation of said output signal.

6. The level detector of claim 4 wherein said logic means comprises a flip-flop including transistors, said malfunction-detecting means including means for detecting the voltage level on the same electrode of each of said transistors, and means for deriving a signal indicative of malfunction only in response to said voltage levels being the same.

7. A system for controlling the amount of material in a conduit or receptacle comprising a source of penetrating radiation irradiating the material, detector means responsive to the amount of said radiation propagated from the material, means responsive to said detector means for deriving a first signal having components respectively indicative of the radiation propagation being greater and less than a first amount and a second signal having components respectively indicative of the radiation propagation being greater and less than a second amount, a bistable circuit element, means responsive to said signal components for activating said bistable element to a first state in response to said first and second signals indicating the radiation propagation is greater than both said first and second amounts and for activating said bistable element to a second state in response to said first and second signals indicating the radiation propagation is less than both said first and second amounts and for maintaining the state of the bistable element constant in response to said signal components indicating the radiation level is between said first and second levels, and means for activating a controller affecting the amount of the material in response to the value of the binary signal.

8. A level detector for material in a receptacle or conduit comprising a source of penetrating radiation irradiating the material, detector means responsive to the amount of said radiation propagated from the material, means responsive to said detector means for deriving first and second binary signals respectively indicative of the radiation propagation being outside first and second limits, and logic means responsive to said binary signals for deriving an output signal indicative of the material level relative to a level established by one of said first or second limits, said logic means including a bistable circuit element, means responsive to said binary signals for activating said bistable element to a first state in response to said first and second signals indicating the radiation propagation is greater than both said first and second limits and for activating said bistable element to a second state in response to said first and second signals indicating the radiation propagation is less than both said first and second limits and for maintaining the state of the bistable element constant in response to said signal components indicating the radiation level is between said first and second levels.

9. A system for analyzing the amount of material in a conduit or receptacle comprising a source of penetrating radiation irradiating the material, detector means responsive to the amount of said radiation propagated from the material, means responsive to said detector means for deriving a binary output signal having a first value in response to the radiation propagation being greater than a first amount, and means for changing the value of said binary output signal only in response to the radiation propagation being greater than a second amount different from said first amount, said binary signal deriving means including averaging means having first and second response times, said first response time being substantially greater than said second response time and effective only in response to the radiation propagation being at one said amounts.

10. A system for analyzing the amount of material in a conduit or receptacle comprising a source of penetrating radiation irradiating the material, detector means responsive to the amount of said radiation propagated from the material, means responsive to said detector means for deriving a binary output signal having a first value in response to the radiation propagation being greater than a first amount, and means for changing the value of said binary output signal only in response to the radiation propagation being greater than a second amount different from said first amount, said binary signal deriving means including: means for deriving a first signal having an average value commensurate with the amount of said radiation propagated, means for comparing the average value of the first signal with a reference signal indicative of one of said amounts to derive one of said binary signals, said comparing means including means for establishing a slow speed of response therefore in response to the average value and reference signal having a unique predetermined amplitude relationship and for establishing a fast speed of response therefor in response to the average value and reference signal having a predetermined amplitude relationship different from the unique relationship.

11. The system of claim 10 wherein said means for deriving a signal having an average value commensurate with the amount of propagated radiation includes a generator for deriving a pulse of predetermined amplitude, width and duty cycle in response to each received radiation count, and said comparing means includes an amplifier having a resistive input responsive to the pulse and reference signal, and a feedback path including a resistor and capacitor in shunt with each other, said amplifier being switched between saturation to cut off in response to the average value being equal to the reference signal.

12. A level detector for material in a receptacle or conduit comprising a source of penetrating radiation irradiating the material, detector means responsive to the amount of said radiation propagated from the material, means responsive to said detector means for deriving first and second binary signals respectively indicative of the radiation propagation being greater than first and second amounts, and logic means responsive to said binary signals for deriving an output signal indicative of the material level relative to a level established by one of said first or second amounts, said logic means including a bistable circuit element, means responsive to said binary signals for activating said bistable element to a first state in response to said first and second signals indicating the radiation propagation is greater than both said first and second amounts and for activating said bistable element to a second state in response to said first and second signals indicating the radiation propagation is less than both said first and second amounts and for maintaining the state of the bistable element constant in response to said signal components indicating the radiation level is between said first and second levels.

13. A system for analyzing the amount of material in a conduit or receptacle comprising a source of penetrating radiation irradiating the material, detector means responsive to the amount of said radiation propagated from the material, means responsive to said detector means for deriving signal components indicative of the radiation propagation being greater and less than a first amount and greater and less than a second amount, a bistable circuit element, and means responsive to said signal components for changing the state of said bistable circuit element only in response to said components indicating the radiation propagation is greater than both the first and second amounts or is less than both the first and second amounts.

* * * * *